MIN US010110578B1

(12) United States Patent
Baer et al.

(10) Patent No.: US 10,110,578 B1
(45) Date of Patent: Oct. 23, 2018

(54) SOURCE-INCLUSIVE CREDENTIAL VERIFICATION

(71) Applicant: Amazon Technologies, Inc., Reno, NV (US)

(72) Inventors: Graeme David Baer, Seattle, WA (US); Gregory Branchek Roth, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 13/797,886

(22) Filed: Mar. 12, 2013

(51) Int. Cl.
G06F 7/04 (2006.01)
H04L 29/06 (2006.01)

(52) U.S. Cl.
CPC .................................. H04L 63/08 (2013.01)

(58) Field of Classification Search
CPC ... G06F 21/6245; G06F 21/00; H04L 9/3228; H04L 9/32; H04L 12/2807; H04W 12/06
See application file for complete search history.

(56) References Cited

U.S. PATENT DOCUMENTS

| 6,182,142 B1* | 1/2001 | Win | G06F 21/604 709/219 |
| 7,979,899 B2* | 7/2011 | Guo | H04L 63/0823 726/20 |
| 7,979,912 B1* | 7/2011 | Roka | G06F 21/34 726/28 |
| 8,037,511 B1* | 10/2011 | Lundy | E05B 47/00 340/686.6 |
| 8,087,074 B2* | 12/2011 | Popp | H04L 9/3228 726/9 |
| 8,713,646 B2* | 4/2014 | Stuntebeck | H04L 67/16 713/150 |
| 2009/0165096 A1* | 6/2009 | Hughes | H04L 63/08 726/5 |
| 2012/0151206 A1* | 6/2012 | Paris | H04L 9/3234 713/155 |
| 2012/0321087 A1* | 12/2012 | Fleischman | H04L 9/3213 380/279 |
| 2013/0167211 A1* | 6/2013 | Kamat | H04L 63/08 726/7 |
| 2013/0178190 A1 | 7/2013 | Celi, Jr. et al. | |
| 2013/0212661 A1* | 8/2013 | Neafsey | G06F 21/45 726/6 |
| 2013/0312073 A1* | 11/2013 | Srivastav | H04L 9/3215 726/7 |

(Continued)

Primary Examiner — Khoi V Le
(74) Attorney, Agent, or Firm — Hogan Lovells US LLP

(57) ABSTRACT

Access to resources or data can be managed based at least in part upon a validation of credentials. A customer can have customer credentials, such as a username and password pair, that can be used to obtain access according to terms of a customer account. A computing device used to gain the access can also have device credentials, which can be based upon identifying information from the device or provided to the device upon a successful login. The customer account might be locked for a period of time if a number of unsuccessful login attempts are received over a designated period of time. If, however, a request is received with device credentials for a trusted and/or recognized device, at least one additional login attempt might be granted in order to prevent a customer from being locked out of the account due to actions of other persons and/or devices.

23 Claims, 6 Drawing Sheets

(56) References Cited

U.S. PATENT DOCUMENTS

2014/0033292 A1\* 1/2014 Moore .................... G06F 21/35
    726/9
2014/0101732 A1\* 4/2014 Cincera .................. G06F 21/32
    726/5

\* cited by examiner

SOURCE-INCLUSIVE CREDENTIAL VERIFICATION

BACKGROUND

As an increasing number of applications and services are being made available over networks such as the Internet, an increasing number of content, application, and/or service providers are becoming responsible for ensuring the security and/or privacy of information associated with their customers. Oftentimes the customers must provide some type of credential, such as a username and password pair, in order to gain access to the information and/or services provided, as may be associated with a customer account. In order to prevent unauthorized entities from simply trying combinations of usernames and passwords until a successful combination is found, certain systems provide for a maximum number of attempts over a period of time before that account is "locked," whereby no one can gain access using a username and password pair for that account for at least a period of time, which will hopefully discourage unauthorized entities from attempting to gain access, or will at least slow the unauthorized entities down to the point where other remedial actions can be taken.

A potential problem with locking out an account after a number of unsuccessful login attempts, however, is that a user might not be able to access an account even when the user has not intentionally done anything wrong. For example, if an application on a device of the user has an old password and continually tries to login to a service in order to obtain the latest messages or data, that application can cause the user account to be locked a majority of the time. If the user attempts to access information for that account, the user will generally be unsuccessful because the maximum number of unsuccessful login attempts have been attempted over a recent period of time, such that the user's login credentials in many cases will not even be analyzed by the service. Similarly, a party can organize an attack on various accounts where unsuccessful login requests are repeatedly submitted, effectively locking out users and making the service unavailable. Various other issues can arise from such a lockout approach as well.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing access to resources, data, or other such elements in an electronic environment. In particular, various embodiments utilize device credentials in addition to customer (or other user) credentials when determining whether to process a request for access. In at least some embodiments, access under terms of an account might be locked out, suspended, or otherwise prevented or disallowed when a number of unsuccessful login or validation attempts are received over a determined period of time. The lockout can apply to requests in general, or at least requests from unknown or unrecognized devices, such that customer credentials supplied during the lockout period will not be analyzed for validation purposes. If, however, a request is received that also has device credentials that can be used to determine the device is a known and/or trusted device, one or more additional login attempts might be allowed for that device. The device credentials might be based at least in part upon identifying information inherent to the device, or might include credentials issued to the device when that device is used to successfully login to the account, among other such options. The number of additional attempts provided can vary based upon any of a number of factors, and can vary dynamically based upon circumstances around the time of the request. If a device is granted one or more additional attempts and one of those attempts is successful in gaining access, the account can be unlocked at least with respect to that device. If no additional attempt is successful and the "trusted" device uses up the number of additional attempts, that device can also be locked out for at least the duration of the lockout period, and may no longer be considered a trusted device in at least some embodiments.

Various other applications, processes, and uses are presented below with respect to the various embodiments.

Figure 1:
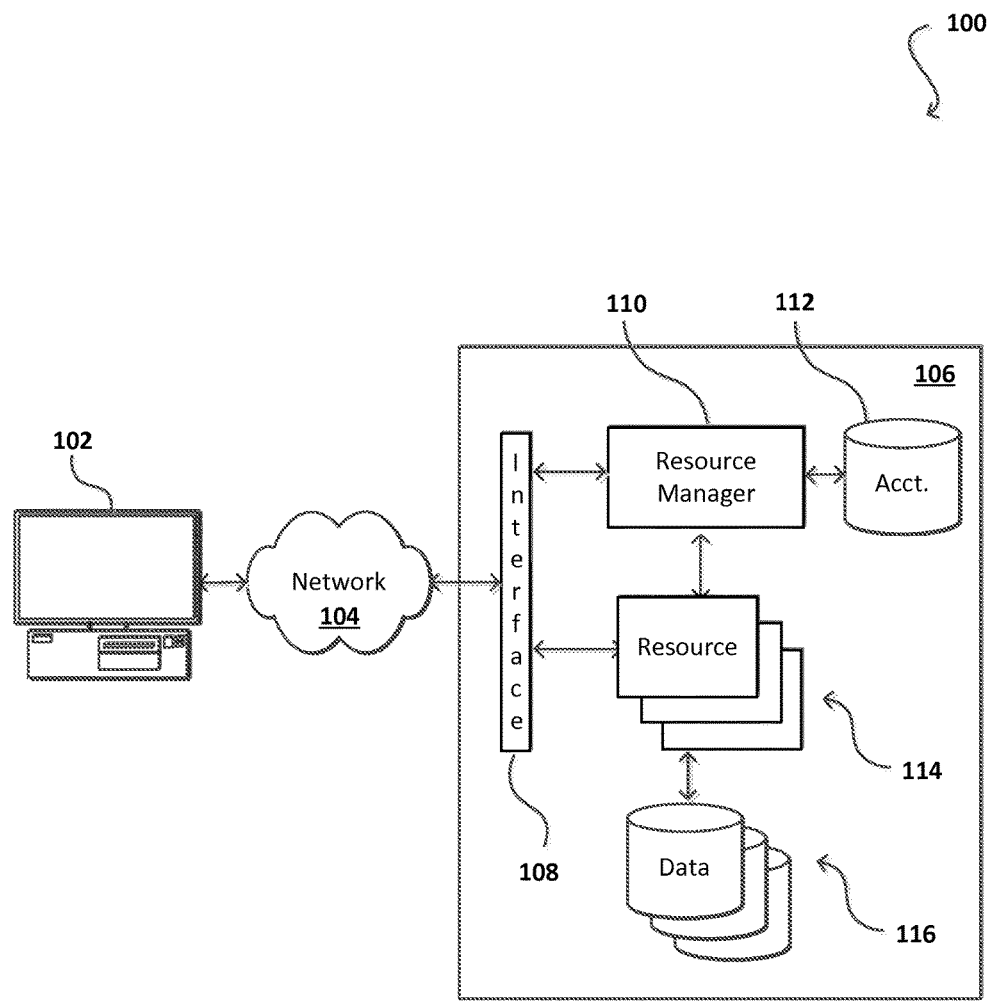
FIG. 1 illustrates an example environment in which various aspects can be implemented.

FIG. 1 illustrates an example environment 100 in which aspects of the various embodiments can be implemented. In this example a user is able to utilize a client device 102 to communicate across at least one network 104 with a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In many situations, a provider of the environment will want to secure access to the resources and/or only to customers having accounts (paid, free, or otherwise) with the provider, and will want to limit access by those customers to the types and/or amounts access provided under the terms of the respective accounts. When setting up a customer account, upon first access under the account, or at another appropriate time, a customer can receive and/or provide credentials that can be used to access the account. For example, a customer can provide a username, such as an email address, and a password that can be used to access the account. Other credentials can be provided and/or specified as well, as may include PIN numbers, keys, tokens, and the like, as may be used with smart cards, hardware keys, dongles, or other such devices in at least some embodiments. When a customer wants to access resources under the account, for example, the customer can submit a request with, or otherwise provide, a copy of the customer credentials which then can be validated in order to provide that customer with access.

Figure 2A:
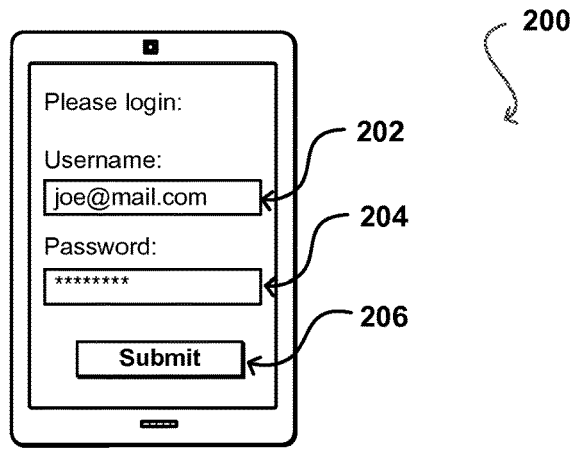
FIGS. 2(a), 2(b), and 2(c) illustrate example interface states that can be displayed during a login process in accordance with the various embodiments.

For example, FIG. 2(a) illustrates an example interface state 200 of a login page that can be used to access resources under an account in at least some embodiments. While the resources in various examples relate to physical resources, such as servers and databases, it should be understood that resources accessible under an account can include content servers and the like, where the customer does not necessarily care about the physical devices but instead wants to access the content offered under the terms of the account. In this example, the interface displayed on the computing device enables a customer to enter a username in a username element 202 and a password in a password element 204, although other credentials can be utilized as well as discussed elsewhere herein. After entering the credentials, the customer can select a submit element 206 or other such option to cause the credentials to be submitted for verification, in order to obtain the desired access. As known for credential entry, at least the password characters might be replaced by asterisks or other characters upon display in order to prevent other people from viewing the characters entered by the customer, which otherwise could subsequently be used to impersonate that customer and gain access to the resources under that customer's account.

As users are accessing more and more content and services electronically, these users increasingly have to remember a larger variety of passwords and credentials. Unfortunately, this results in users occasionally forgetting which credentials the user assigned to which accounts, applications, services, etc. This can result in the user inputting a couple of incorrect sets of credentials before providing the one(s) that actually correspond to a given account. While it can be desirable from a user standpoint to allow the user to keep entering credentials until the user provides the proper credentials, such an approach is generally not advisable from a security standpoint. For example, an automated process (e.g., a "bot") could continue trying passwords for a given username until the credentials are successfully validated, granting an unauthorized user or entity access to the resources under the account.

Figure 2B:
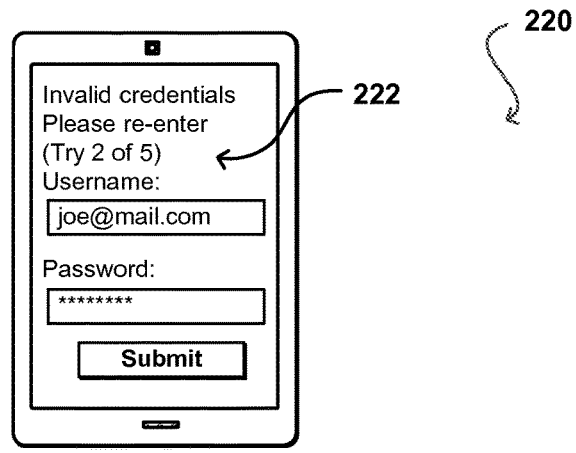
Figure 2C:
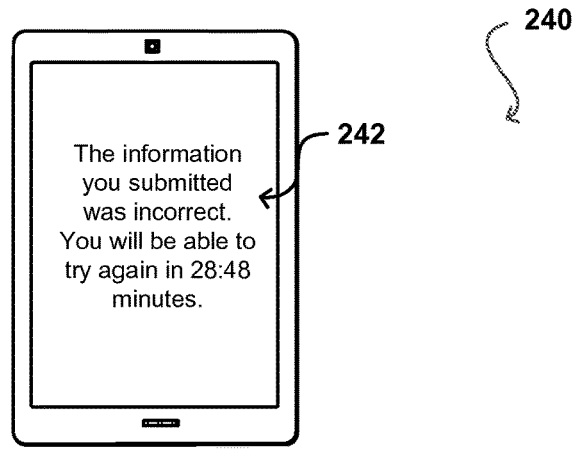

Accordingly, many account providers limit the number of attempts that can be provided over a given period of time. For example, FIG. 2(b) illustrates an example interface state 220 that can be displayed in response to a user entering incorrect credentials for the corresponding account. In this example, the user is allowed to submit another set of credentials, and is informed that the previously submitted set was not correct. Further, the user can be presented with a notification 222 that the user has a limited number of additional attempts before the account is locked. In this example, the provider has configured the account to allow up to five attempts to submit correct credentials over a thirty minute period of time. If five incorrect attempts are made within any thirty minute period, the account can be locked out for a determined period of time, such as another thirty minutes. Such an approach can make it difficult for an automated process to gain access to an account, as the large number of potential passwords combined with the ability to only submit up to five over a thirty minute period of time means that it can take a very long time to determine the appropriate password, on average. FIG. 2(c) illustrates an example interface state 240 that can be displayed in response to the maximum number of unsuccessful attempts being reached over (at most) the designated period of time. In this example, the user is not provided with another attempt to login to the account, but instead is provided with a message 242 or other indication that the maximum number of attempts has been reached. In this example, the device also tells the user when the user can try logging in again, although for security purposes this information may not be provided in at least some embodiments.

While such an approach can reduce the success rates of various types of attacks, it can come with various disadvantages for a user, and can unintentionally enable other types of attacks. For example, if an unauthorized user or process attempts to gain access to the account and causes the account to be locked out for a period of time, the user associated with that account also can be unable to access that account for the period of time, even though the user may have done nothing wrong. If the period of time is known, an automated process can be configured to submit incorrect passwords or credentials at specified times or intervals, which can cause the user account to be locked out a vast majority of the time. If an automated process can gain access to, or otherwise determine, the list of usernames for accounts with a provider environment, the process can effectively take the environment down for all intents and purposes, as all the users will be locked out of their accounts due to incorrect credential submission.

Accordingly, approaches in accordance with various embodiments utilize source (e.g., device) credentials along with customer credentials in order to determine whether or not to process a request for an account, where that account might have been locked out due at least in part to a number of unsuccessful login attempts over a period of time. For example, a device might contain a unique identifier (or other such identifier) that can be submitted with customer credentials to be validated. Upon receiving the credentials, a determination can be made as to whether the account is locked out for any device. If so, another determination (or part of the same determination) can be made as to whether the account is locked out with respect to the particular device associated with the received request. If not, the credentials can be processed to determine whether to grant access. Depending at least in part upon whether the credentials are then validated, a determination can be made as to whether to lock out that device with respect to the account.

Figure 3:
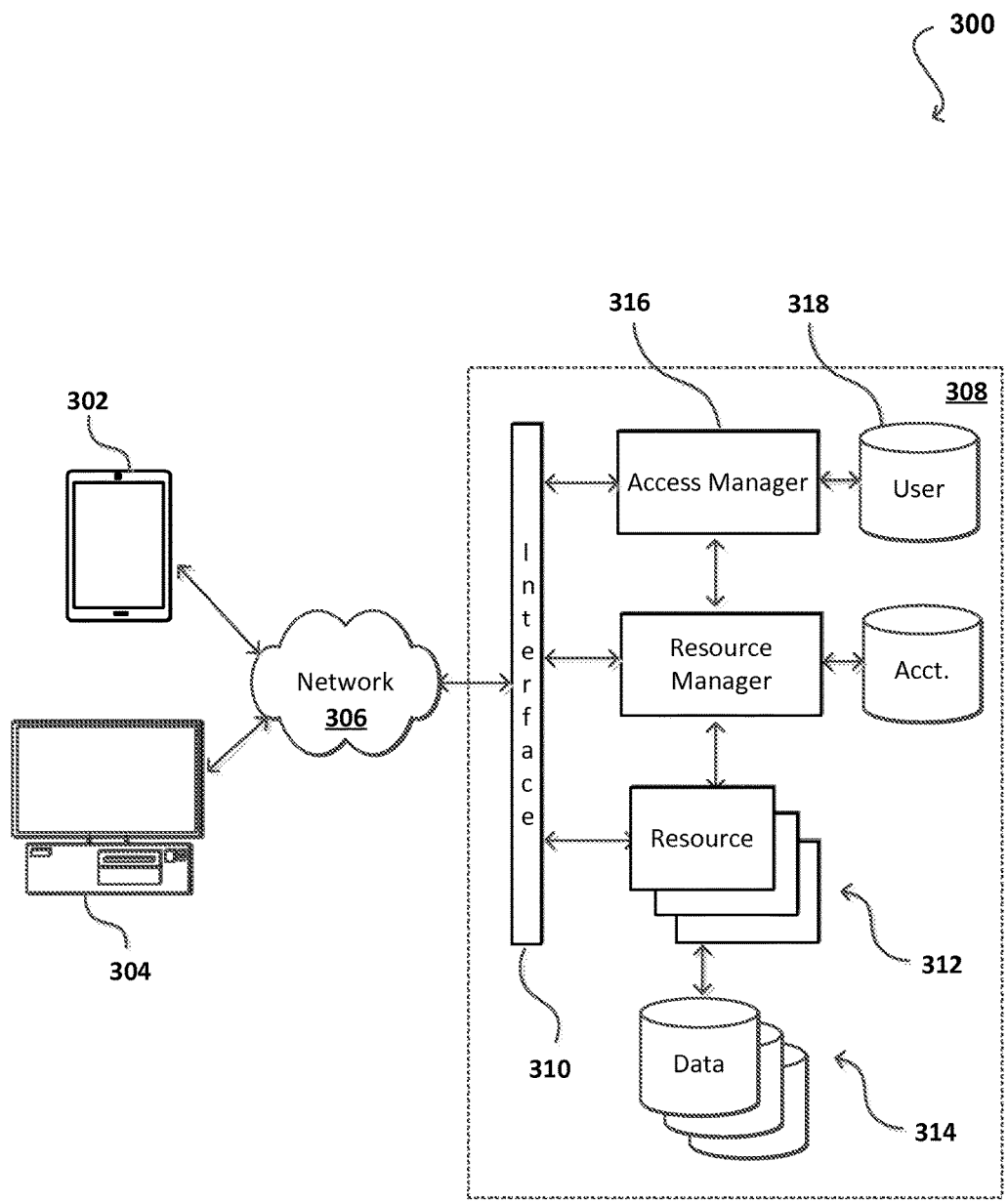
FIG. 3 illustrates an example environment in which user and device credentials can be analyzed in accordance with the various embodiments.

FIG. 3 illustrates an example environment 300 that can be utilized in accordance with various embodiments. In this example, a customer having an account with a resource provider can use a number of different client devices, such as the devices 302, 304 shown, to communicate with a resource provider environment across at least one network 306. When the customer wants to access resources 312 and/or data stored in one or more data stores 314 of the environment, the customer can submit a request for access. As discussed, the access can require submission of the appropriate credentials for the customer. The customer credentials can either be automatically supplied with the request, or an interface can enable the user to manually provide credentials, as discussed previously.

In this example, the customer submits a request for access from one of the client devices 302, and the request is directed to an access manager 316, or other service or component, of the provider environment to determine whether credentials are needed for the requested access, as well as whether credentials have been provided for the access. If the request is a first request or credentials have otherwise not been provided for the access, the access manager 316 can cause an interface to be displayed on the client device 302 that enables the user to input, select, or otherwise specify or provide the credentials. In this example, the user can provide a username and password pair, although other credentials can be used as well as discussed elsewhere herein. The software or script executing on the client device 302 can submit a request including the username and password pair. In this example, the software or script can also provide information that in some way identifies the client device 302 as well, either as part of the same request or as a separate request.

For example, a client device such as a notebook computer might have installed thereon at least one trusted platform module (TPM). A TPM in at least some embodiments can take the form of a secure crypto-processor that can store one or more cryptographic keys that can be used to protect information. At least some of these keys can be endorsement keys installed by an original equipment manufacturer (OEM) during manufacture, for example, that are capable of being used to remotely prove the set of software that is running on the client device, as well as to remotely prove an identifier ("ID") for the client device upon which the software is running. Various other types of device identifiers can be used as well within the scope of the various embodiments. The software executing on the client device can obtain this information, if not already stored in memory, and submit this information to the provider environment. Other cryptographic storage devices can be used to store device credentials on a computing device as well, as may include smart cards or subscriber identity module (SIM) cards, among others.

Upon receiving the information, the access manager can compare the credentials against information stored in a credential data store 318 or other such location to determine whether the credentials provided by the customer match, or otherwise correspond to, the credentials stored for that customer on the relevant account. If so, the customer can be granted access to the resources and/or data per the terms of the account. In at least some embodiments, a token or cookie can be provided to the client device 302 for storage in a browser or other appropriate location. As known for such purposes, the token or cookie can be provided with subsequent requests for the account in lieu of having to provide the username and password pair again. Identifying information for the client device 302 can also be stored in the credential data store 318, or another appropriate location, as identifying a device that was used to successfully access an account with the provider environment. The device identifier can be associated with information for the customer as well, as well as potentially any other customer that utilizes that device to access resources or data under the same or a different account. In some embodiments, a customer might be able to have identifiers for up to a determined number of devices stored, such as up to the last ten devices that the customer used to access an account.

If the supplied credentials do not correspond to the correct credentials for the customer, the access manager can determine how many unsuccessful attempts to access the account have been made over a recent period of time. As mentioned, a provider might allow for a maximum number of login attempts over a given period of time, where the same or differing numbers of attempts or periods of times can be provided for different types of customers or accounts, etc. In this example, there might be up to five unsuccessful login attempts allowed from any device(s) over a period of time such as a half hour. The access manager 316 can store this information in memory or in a data store, for example, and when a request is received can determine whether the maximum number of unsuccessful attempts has been received over the most recent period of time, such as the last half hour. In some cases, when the maximum number of attempts has been received over the appropriate period of time the account can be locked out for a period of time, such as a half hour, whereby the information stored locally might no longer be information for the number of unsuccessful attempts, but might instead be a flag or value indicating that the account has been locked, as well as a time at which the account will no longer be locked and additional login attempts can be processed.

In this example, since only one unsuccessful attempt was received, the access manager can process the second request and analyze the submitted credentials to determine whether or not to grant the customer with access. This process can continue until the customer either stops attempting to login, successfully logs in, or provides the maximum number of unsuccessful login attempts. If the maximum number of unsuccessful login attempts over the specified period of time is reached, the account that the customer has been attempting to access can be "locked out" for at least a specified period of time, such that login attempts during that time will not be processed.

As discussed, however, such an approach alone might cause a customer to be locked out of an account even when the customer did not previously try to login, such as where the login attempts were performed by another entity. Since approaches in accordance with various embodiments capture information about the specific devices used to make requests or attempt login, this information can be used to adapt the way in which the lockout process works for different devices.

For example, the customer might have two devices 302, 304 as illustrated in FIG. 3. If the customer previously successfully logged into the account using one 302 of the devices, the information for that device can be stored by the access manager 316, for example, which can cause that device to be recognized as a "trusted" device, or at least a device that has successfully accessed resources in the past. In at least some embodiments, trusted devices can be treated differently from other devices, at least for certain accounts, customers, and/or applications.

It might be the case that an automated process running on an unknown device attempts to access the customer's account by submitting requests with "guesses" at the customer's credentials, which could cause the account to be locked out for a period of time. In other cases, a device might continually attempt to gain access by using old credentials that the customer has not updated, which could also cause the account to be locked out for a period of time. If the customer uses a device 304 that the customer has not previously used to successfully login to the account, or that otherwise is not associated with the user or designated as a trusted device, the request can be denied without even analyzing whether the credentials are accurate, as the device 304 is not recognized and thus is subject to the general lockout on the account. For example, the user might attempt to login to the account using the unknown device 304. If the user submits a request from directly from the device 304, software on the device can cause the device information to be sent with the request. If information for the device is not provided, the access manager 316 or another component of the provider environment can contact the device 304 to obtain the information, if available. If the access manager determines that the account has been locked, the access manager 316 can analyze the identifying information for the device to attempt to determine whether or not the device 304 is a trusted device. In this example the device is determined to not be recognized as a trusted device, such that the request is denied. Other approaches might be taken in other embodiments, however, such as where each device might be allowed one attempt to login even if unrecognized. In some embodiments, each device that is unsuccessful in logging into an account might also be tagged as an "untrusted" device and have information stored such that fewer attempts might be allowed for that device in future request attempts.

If, on the other hand, the user attempts to login using the trusted device 302 that the user previously used to access the account, the lockout process might treat that device 302 differently. For example, the access manager 316 might analyze the identifying information for the device 302 to determine that the device is a "trusted" device. The access manager might then attempt to determine whether or not that particular device 302 was used to attempt a login over the designated period of time. If not, the access manager can analyze one or more rules or policies to determine how many, if any, attempts can be made from the trusted device 302 even though the account is otherwise "locked out." If the necessary credentials are supplied from the trusted device 302, access can be granted to the customer. The lockout might be lifted, or the lockout might remain in place for all other devices. If credentials submitted from the trusted device do not match or are not sufficient to obtain access, and the maximum number of additional attempts are received from the trusted device, then the trusted device can be locked out as well, at least for the remaining of the general lockout period. In some embodiments, these additional attempts might extend the lockout period, or might cause other trusted devices to be locked out as well. Various other approaches can be used within the scope of the various embodiments.

As discussed, in some embodiments there might be a maximum number of "recognized" devices for a customer. For example, the system might keep track of the last ten devices that the customer used to login to the environment or access the account. Each of these devices then can also have at least one additional login attempt available during a lockout, as being a trusted and/or recognized device associated with the customer. The list can be updated automatically as new devices are used to login. The number of additional attempts can be the same for each of these devices, or can vary based upon factors such as type of device, type of information available, number of previous successful attempts, number of previous unsuccessful attempts, and the like. In some embodiments, these recognized devices might be treated as part of a pool of devices, where a maximum number of additional attempts is allocated to the pool as a whole, and any device or combination of devices in the pool can cause the maximum number to be reached.

In some instances, a device might not have an identifier of a type that is able to be used for validation, or at least is reliable enough to be utilized for account lockout modification, etc. In some embodiments, each of these devices can be given one attempt to successfully login or be authenticated, while in other embodiments these devices can always be treated as untrusted devices, and subject to general lockout rules for an account. As discussed, upon a successful login a device in accordance with certain embodiments can be granted an object such as a long-lived token that can be stored on the client device and valid for a determined lifetime. Even if the device is unable to be identified using a trusted identifier, the possession and/or presentation of the long-lived token may be sufficient to enable that device to obtain at least one additional login attempt, after which no device associated with that token can make a request during the remainder of the lockout period.

Figure 4:
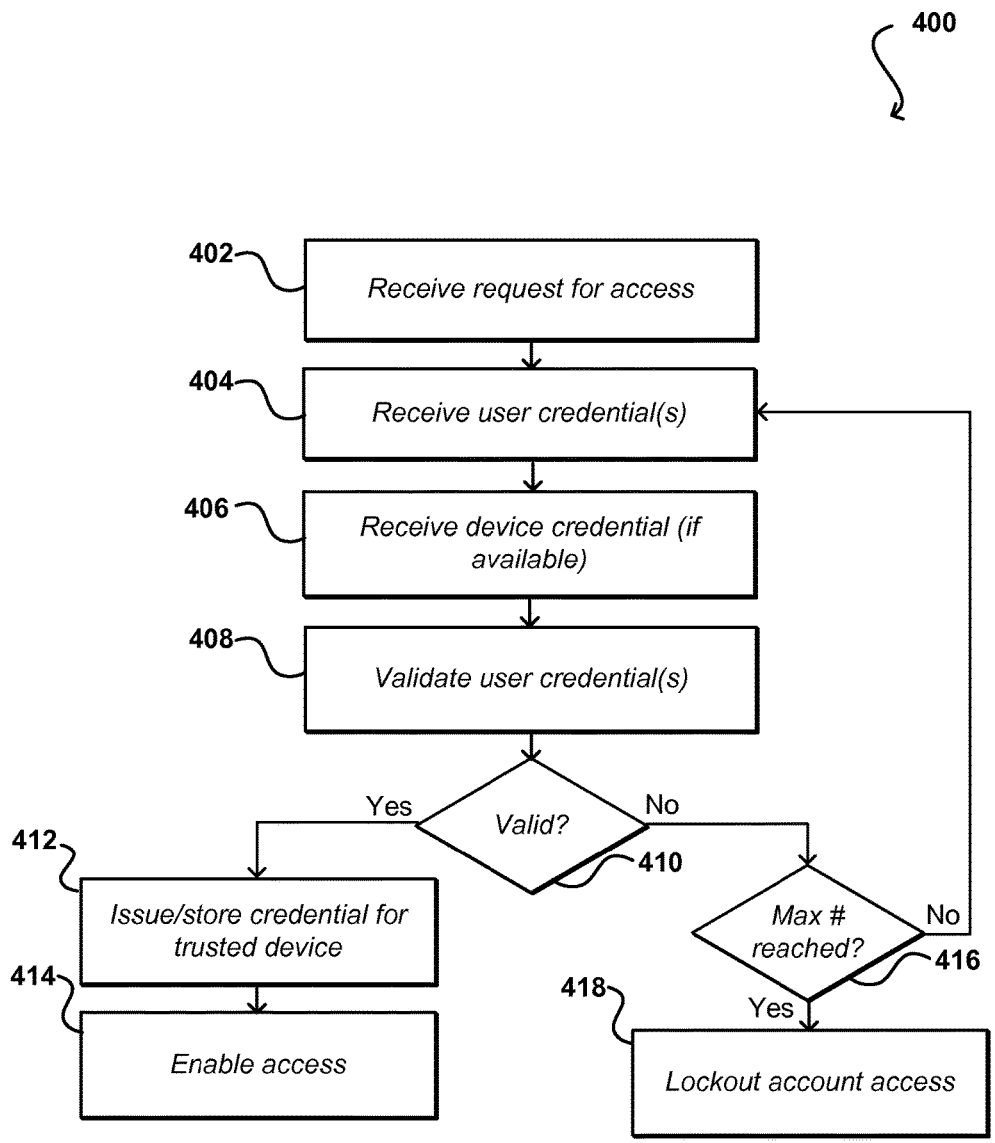
FIG. 4 illustrates an example process for determining whether to provide access in response to a request that can be utilized in accordance with various embodiments.

FIG. 4 illustrates an example process 400 for managing account lockout that can be utilized in accordance with various embodiments. It should be understood that there can be additional, fewer, or alternative steps performed in similar or alternative orders, or in parallel, within the scope of the various embodiments unless otherwise stated. In this example, a request for access is received 402 from a computing device. The request can be a login request, for example, that attempts to obtain access to resources and/or data associated with a customer account. One or more user credentials can also be received 404, either separately or as part of the request for access. As discussed, these can include any appropriate credentials, such as username/password pairs, PIN numbers, RSA tokens, multi-factor authentication devices, biometric data, and the like. If at least one device credential is available, that information can also be received 406, either as part of the request, as a separate request, or upon a request for the device credential. As discussed, the device credential can include a TPM key or other reliable identifier associated with the computing device, or a token, cookie, or other device previously provided to the device, among other such options. As discussed, at least some devices or types of devices will not have such identifiers, at least before a successful login attempt or other such event.

Once at least the user credentials are received, an attempt can be made to validate 408 the user credentials. As discussed, this can include comparing the credentials to information stored for the user or otherwise associated with a user account. If the credentials are determined to be valid 410, credential information for the computing device from which the request was received can be stored and/or issued 412 to indicate that the device is a trusted device. If a credential inherent to the device was provided, information for that device credential can be stored by an access manager or other such component such that the manager can know that the device is a trusted device when subsequent requests are received from that device. If a device credential was not provided, or in some embodiments even when a credential was provided, a device credential such as a token or cookie can be provided that can be submitted with future requests as an indicator that the request comes from a trusted device. Various other such approaches can be utilized as well. Along with storing and/or providing the device credential information, access can be granted 414 under the terms of the account.

If the user credential(s) supplied are not sufficient to grant access, a determination can be made 416 as to whether the incorrect login attempt has caused the maximum number of unsuccessful attempts to be reached. As discussed, this can include a specified number of attempts over a recent period of time, such as a minute, a half hour, an hour, or any other appropriate period, as may vary based upon factors such as the type of account, the type of access requested, a customer role, a policy for the type of access, etc. If not, the user (or another appropriate party or device) can continue to attempt to login using different user credentials. If the unsuccessful login request causes the maximum number to be reached, access to the account can be locked out 418 for at least a designated period of time, such that additional login attempts will not be processed during that period. As discussed, this can be a lockout for all devices, or at least untrusted or unrecognized devices, among other such options. In some embodiments, the device used to submit one or more of the unsuccessful attempts that led to the lockout can be caused to be an untrusted device, or at least added to a list of devices not to be allowed a login attempt during the lockout period.

Figure 5:
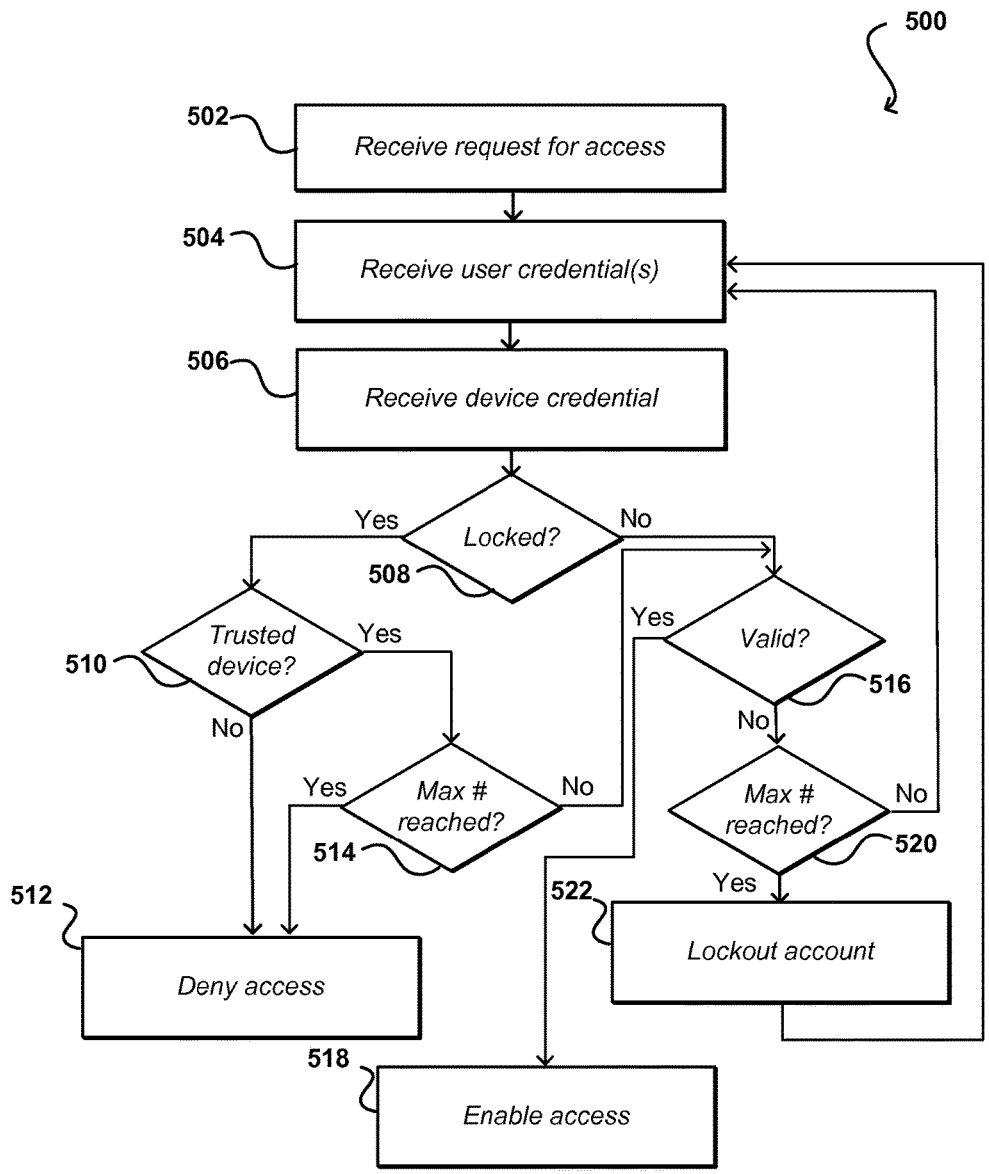
FIG. 5 illustrates another example process for determining whether to provide access in response to a request that can be utilized in accordance with various embodiments.

FIG. 5 illustrates another example process 500 for determining whether to grant access that can be utilized in accordance with various embodiments. In this example, a request for access is again received 502 from a computing device. In this example, one or more user credentials are received 504, along with at least one device credential being received 506, either with a single request or separate requests, among other such options. In response to receiving the request for access, a determination can be made 508 as to whether access to the account is locked, in order to determine whether to process the access request. If the account is determined to be locked, another determination can be made 510, using the one or more device credentials, as to whether the device is currently considered to be a trusted device. As discussed, this can include the device having previously been used to successfully login, having been associated with a user, or having met at least one other such criterion. If the device is not a trusted device, and the account is currently locked, the request for access can be denied 512, barring some other circumstance as discussed elsewhere herein. If the device is a trusted device, a determination can be made 514 as to whether the maximum number of attempts has been made for the particular trusted device. In some embodiments, the device credentials can be used to determine an appropriate policy to apply for the device, in order to determine whether additional login attempts should be granted for the device. As discussed, in some embodiments a trusted device can be allowed one or more extra login attempts even when an account is otherwise locked, and the system can track the number of unsuccessful login attempts for a particular device to determine whether or not to accept and process a request from that device. In some embodiments, a trusted device causing an unsuccessful login attempt to be submitted can cause that device to no longer be considered a trusted device, at least for the remainder of the lockout period, such that no additional requests from that device will be considered during the lockout period.

If the account is not currently locked, or if the account is locked but the computing device submitting a login request is a trusted device with at least one remaining login attempt available, the submitted user credential(s) can be processed and a determination made 516 as to whether the credential(s) are valid. If so, access to the account can be enabled 518, which in some embodiments can cause a token or cookie to be provided or updated for a device if necessary. If the user credential(s) submitted are not valid for the access requested, a determination can be made 520 as to whether the unsuccessful attempt has caused the maximum number of unsuccessful attempts to be reached for the account and/or device. If not, credentials can continue to be received and processed from the computing device, in an attempt to provide the requested access. If, on the other hand, the maximum number has been reached, the account can be locked out 522. If the account was not previously locked, this can be a general lockout for untrusted devices, as discussed above. If the account was locked and this is the maximum number for a particular device, type of device, or pool of devices, for example, the lockout can be extended to cover the device, type, or pool, etc. Various other approaches can be utilized as well within the scope of the various embodiments, as discussed and suggested elsewhere herein.

In some embodiments, a Bloom-filter type approach can be used to provide for an adaptive lockout. For example, each time a device becomes a trusted device (or potentially an untrusted device) an entry for that device can be added to a probabilistic data structure. When a request is received from a device having a device credential, the Bloom filter-type approach can be used to determine whether or not the device is a trusted (or untrusted) device, which can be used to determine whether or not to lockout the particular device, as well as to determine which policy to apply to determine whether to lockout the device.

In some embodiments, the number of attempts granted to a trusted device can change based at least in part upon the aggregated activity with respect to the account. For example, a user might reasonably be expected to attempt to login from a number of devices, such as up to ten devices. If login attempts over a relatively short period of time are seen from more than ten devices, such as fifteen to twenty devices, that activity can be indicative of a potential attack, which can cause the number of attempts for a trusted device to be reduced, if not set to zero for a period of time. For example, activity from an abnormally large number of devices can cause the number of attempts allowable from each trusted device to be reduced to one, at least until the account is no longer locked or until a designated period of time passes. In some embodiments, an unusually large amount of activity or access from an unusually large number of devices can cause the user to be requested to update credentials, in order to ensure that the access is valid and not a result of one or more entities obtaining a copy of the prior credentials.

In some embodiments, a change to user credentials can be automatically propagated to one or more trusted devices. As discussed, a user can either set or update credentials, or can be prompted to update credentials in response to certain types of activity. In some embodiments, such as where tokens are sent to each device that are associated with the account, a user can have the option of selecting one or more devices that is associated with the account and/or user to automatically receive updated credentials. Such an approach also enables a user to manage (e.g., add, delete, update, or confirm) the devices that are to be considered trusted devices for the particular user or account.

Various other factors can be used as well to determine whether or not a device should be considered a trusted device. For example, the network or address used to send a request can be analyzed and used to determine whether to allow an extra request, such as may be based upon a number of incorrect login attempts from a network or an address being associated with a customer location. Similarly, certain geographical locations or regions might have different policies that apply with respect to trusted devices. If a particular country or city has an unusually high amount of suspicious activity, the number of additional attempts before lockout might be reduced. Similarly, if an area has very little such activity then devices in that area might be given additional attempts, or at least given the maximum number of attempts, etc. Various other factors can be considered as well, such as service providers, device types, application data, etc.

In some embodiments, the type of device might affect the policy that is applied. For example, a user might be more likely to enter an incorrect password on a device with a small keyboard or touch screen entry, such as a smart phone, than on a desktop computer with a full size keyboard. Further, a user might be more likely to enter an incorrect password on an unfamiliar device than a device often used by the user. These factors can affect how many additional attempts the user is given on a particular type of device, or various factors or capabilities of the device. In some embodiments, types or classes of devices might have an error rate determined, which can be used to determine how many retry attempts should be granted for that type of device.

In some embodiments, a user can have the option of associating a particular device with the user, or having that particular device considered a trusted device. For example, a user might get a new tablet computer and might want to associate that device with the user. On the other hand, a user might use a public computer at a hotel or conference center and might not want that computer designated as a trusted computer for the corresponding account. In at least some embodiments, the user can be presented with an option enabling the user to indicate whether or not to associate or designate the device as a trusted device. Various other selection options can be utilized as well.

Figure 6:
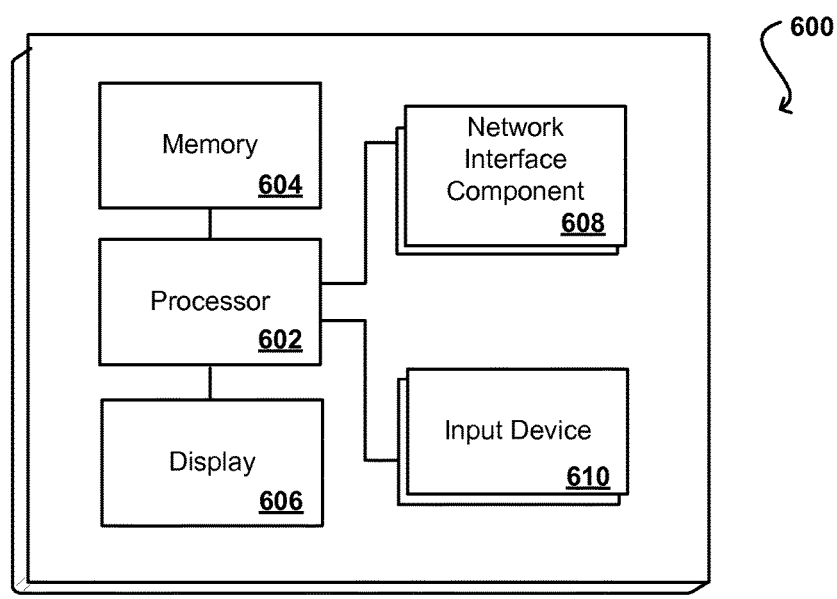
FIG. 6 illustrates example components of a computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, JavaScript, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for managing access to a set of resources, comprising:
   at least one computing device processor; and
   instructions that, when executed by the at least one computing device processor, cause the system to:
     suspend access associated with at least one customer credential in response to a number of unsuccessful access attempts;
     receive, from the computing device, a request for access to at least a portion of the set of resources, the request associated with the at least one customer credential and at least one device credential, wherein the at least one device credential comprises an identifier associated with the computing device;
     analyze the at least one device credential to determine whether the computing device is a trusted device;
     process the at least one customer credential request when access associated with the at least one customer credential is suspended but at least one additional access attempt is available for the computing device as the trusted device; and
     provide the access to at least the portion of the set of resources in response to the at least one additional access attempt and the at least one customer credential being validated for the at least one additional access attempt.

2. The system of claim 1, wherein the instructions when executed further cause the system to:
   deny the request when the computing device is not the trusted device and the access is suspended for a period of time.

3. The system of claim 1, wherein the instructions when executed further cause the system to:
cause the computing device to no longer be the trusted device when the at least one customer credential associated with the request is not validated for the access and the number of additional access attempts granted for the computing device is reached.

4. The system of claim 1, wherein the instructions when executed further cause the system to:
provide a token to the computing device in response to the at least one customer credential being validated for the access, the token being able to be provided with subsequent requests for access.

5. The system of claim 1, wherein the instructions when executed further cause the system to:
determine, based at least in part upon whether access is suspended, whether the at least one device credential is required for access to at least a portion of the set of resources.

6. A computer-implemented method, comprising:
placing a customer account in a lock state when a maximum number of unsuccessful login attempts for the customer account is received;
receiving, from a computing device, a login request associated with the customer account, the login request associated with a customer credential and a device credential, wherein the device credential comprises at least an identifier corresponding to the computing device;
in response to determining that the customer account is in the lock state, processing the device credential, when the customer account is in the lock state, to determine that the computing device is a trusted device with at least one available login attempt; and
accepting and granting the login request when the customer credential matches information for the customer account and the customer account is in a lock state from a number of unsuccessful login requests and the computing device is a trusted device that has at least one available login attempt.

7. The computer-implemented method of claim 6, further comprising:
placing the customer account in the lock state when the maximum number of unsuccessful login attempts for the customer account is received over a specified period of time.

8. The computer-implemented method of claim 6, further comprising:
determining a policy for the computing device, the policy indicating whether the at least one additional login attempt is available for the computing device.

9. The computer-implemented method of claim 6, further comprising:
denying the login request in response to no additional login attempt being available for the computing device.

10. The computer-implemented method of claim 9, further comprising:
causing the computing device to no longer be the trusted device when the login request is not accepted.

11. The computer-implemented method of claim 6, wherein the device credential includes at least one of a device identifier, an endorsement key, or a device token.

12. The computer-implemented method of claim 6, wherein the customer credential includes at least one of a username password pair, a PIN number, a customer key, a one-time password generating device, a multi-factor authentication device, biometric data, or a customer token.

13. The computer-implemented method of claim 6, further comprising:
providing a token to the computing device in response to login request being accepted.

14. The computer-implemented method of claim 6, further comprising:
storing information for up to a maximum number of computing devices most recently used to successfully login with the customer credential, the information enabling at least one additional login attempt to be granted for a corresponding computing device when the customer account is in a lock state.

15. The computer-implemented method of claim 14, further comprising:
enabling a customer associated with the customer account to specify whether to store the information for one of the computing devices used to successfully login.

16. A non-transitory computer-readable storage medium including instructions that, when executed by at least one processor, cause the at least one processor to:
place a customer account in a lock state when the maximum number of unsuccessful login attempts for the customer account is received;
receive, from a computing device, a request for access to at least one resource associated with customer account, the request associated with a customer credential and a device credential, wherein the device credential comprises at least an identifier corresponding to the computing device;
in response to the customer account being determined to be in the lock state from a number of unsuccessful login requests, process the device credential to determine whether the computing device is a trusted device with at least one available login attempt;
determine whether the customer credential matches information for the customer account when the customer account is in a lock state and the computing device has at least one available login attempt; and
provide the access corresponding to the request when the customer credential matches information for the customer account and the customer account is in a lock state and the computing device is a trusted device with at least one available login attempt.

17. The non-transitory computer-readable storage medium of claim 16, wherein determining whether to process the customer credential includes determining whether at least one additional access request is available for the computing device based at least in part upon the computing device being recognized as the trusted device based at least in part upon the device credential.

18. The non-transitory computer-readable storage medium of claim 16, wherein the instructions when executed further cause the at least one processor to:
provide a token to the computing device in response to login request being accepted.

19. A system comprising:
a computing device storing a device credential; and
a resource access management service configured to determine whether to grant the computing device with access to at least one resource associated with a customer account, the resource access management service including at least one processor and instructions that, when executed by the at least one processor in response to receiving a login request from the computing device, cause the resource access management service to:
determine that the customer account is in a lock state from a number of unsuccessful login requests;

process the device credential to determine that the computing device is a trusted device with at least one available login attempt;

process the login request when the customer account is in the lock state and the computing device is a trusted device with at least one available login attempt; and provide the access to the at least one resource when a customer credential from the login request matches information for the customer account and the customer account is in the lock state.

20. The system of claim 19, wherein the device credential is provisioned to the computing device during manufacture of the computing device.

21. The system of claim 19, wherein the device credential is stored in one or more cryptographic storage devices on the computing device.

22. The system of claim 21, wherein the at least one or more cryptographic storage devices includes at least one of a trusted platform module (TPM), a smart card, or a subscriber identity module (SIM) card.

23. The system of claim 19, wherein the instructions further cause the system to:

suspend access associated with the at least one customer credential in response to a number of unsuccessful access attempts from one or more computing devices different than the computing device.

* * * * *